Aug. 2, 1932.   L. HICKS   1,869,810
PROCESS OF MAKING CHILLED FOOD PRODUCTS
Filed Jan. 28, 1927
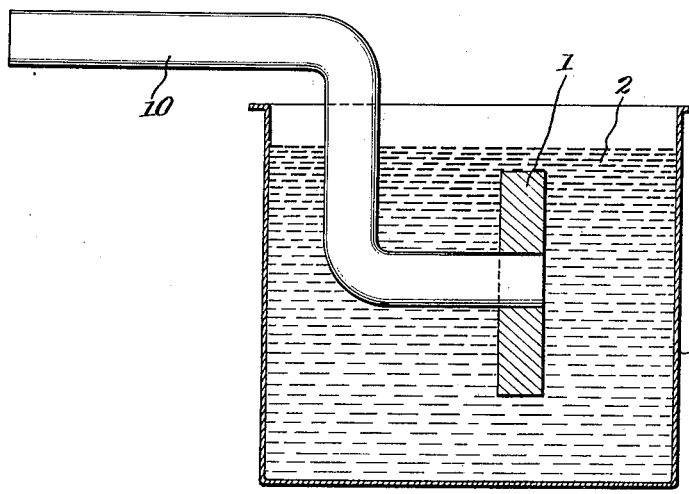
Fig.1.
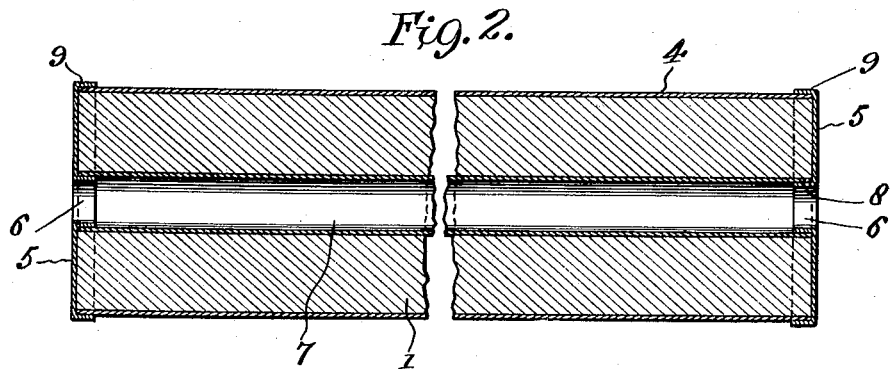
Fig.2.
Fig.3.
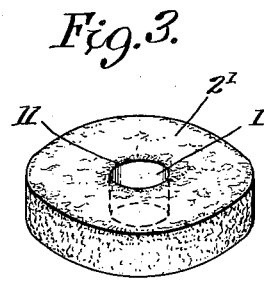
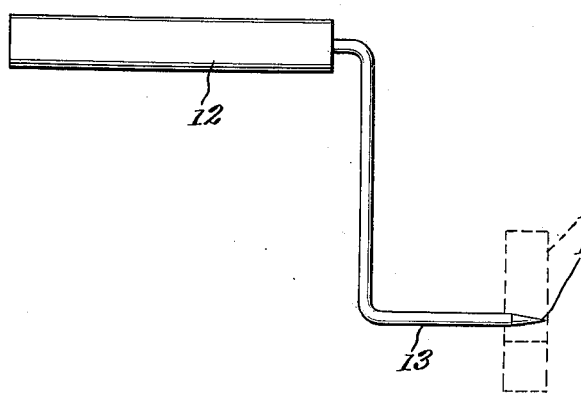
Fig.4.
Inventor
Linzy Hicks
by Edgar M Kitchin
his Attorney Patented Aug. 2, 1932

1,869,810

UNITED STATES PATENT OFFICE

LINZY HICKS, OF LEXINGTON, KENTUCKY

PROCESS OF MAKING CHILLED FOOD PRODUCTS

Application filed January 28, 1927. Serial No. 164,312.

This invention relates to improvements in the art of producing chilled or frozen dainties or like food products, and has, among its objects, the provision of means for facilitating sanitary handling and ready observation of the condition of the product.

With these and further objects in view as will in part hereinafter become aparent and in part be stated, the invention comprises certain novel steps and combinations and arrangements of steps as subsequently specified and claimed.

In the accompanying drawing,—

Figure 1 is a transverse section through a coating vat and cake of food product, an operating tool, being shown in elevation, all as utilized in the carrying out of the invention.

Figure 2 is a similar view through the parts employed in the production of the cake.

Figure 3 is a perspective view of the completed cake.

Figure 4 is a view in side elevation of a modified form of operating tool, a fragment of the cake being indicated in dotted lines.

It is to be understood that the term "cake" as used herein is employed to designate the body and not the material of the substance referred to.

While the invention is applicable to other substances, an illustrative embodiment may be readily understood by considering the cake seen at 1 in Figure 1 as being formed of ice-cream, water-ice, or the like, immersed in a bath 2 of chocolate, or like flavoring edible coating substance. The bath 2 is retained by any appropriate container 3.

To produce the cake 1, a tubular housing 4 is employed having a removable cap or closure 5 at each end, each cap or closure 5 being provided with a centrally disposed, inwardly-extending, annular boss 6, the said bosses extending into the respective ends of a tubular core 7 arranged preferably axially of and within the housing 4.

In carrying out the preferred steps of the process the housing 4 is provided with a cap 5 at one end, and the core 7 is located to engage the boss 6 of the applied cap. The housing 4 is then set in an upright position with the applied cap located to serve as a bottom. Next the substance of which cake 1 is to be formed is introduced preferably in a semi-fluid or partially frozen condition. Any mechanical apparatus may be used, such, for example, as an injector nozzle for filling the housing 4, while in the upright position. As soon as the housing 4 is filled, the top closure or cap 5 is applied, and to facilitate filling, the lower end portion of core 7 and the corresponding flange 6 are preferably provided with an air escape opening 8 of sufficiently small cross section to prevent escape of any appreciable quantity of the partially frozen material. Thus the material may be and is solidly packed within the housing 4 before the second cap 5 is applied. After the housing has thus been filled and the second cap applied, the filled housing is placed in the refrigerating plant or area and left in surroundings at such low temperature as to effect relatively or quite rigid hardening of the contained material. Each cap 5 is provided with an annular enclosing flange 9 surrounding the respective end portion of the housing 4, the flange being of sufficient length to allow the cap to move slightly longitudinally of housing 4 without becoming disengaged therefrom, and each boss 6 is of a length corresponding to the width of the respective flange 9, so that the expansion of the contents of the housing 4, under the freezing action just described, may occur without breaking the seal between the caps 5 and housing 6, and between said caps and the core 7.

After the contents of housing 4 has been appropriately and satisfactorily hardened, the housing is removed from the freezing chamber and immersed in water or like bath to cause a slight expansion of the housing and caps, said housing and caps being preferably made of metal. Immediately following the immersing of the housing, it is removed from the tempering bath (the water used being preferably at room temperature or below), one of the caps 5 is removed, and the operator inserts his finger into the bore of core 7 and withdraws the same. Because of the expansion of the housing 4 under the action of the bath, the engagement of the frozen contents against the inner surfaces of the wall of the housing is relaxed, and the said frozen contents, therefore, slide out along with the core 7 as it is being removed. The core 7 is then stripped from the frozen material which is thus left in the form of a tubular cylinder, and said cylinder is placed on the cutting table where it is cut up into cakes 1 by strokes of the cutting instrument transversely of the longitudinal axis of the cylinder. The cakes thus obtained are preferably laid flat upon a supporting table and so spread out as to be readily available. The operator then inserts a tool into the center opening of the cake 1, such as the tool seen at 10 in Figure 1. This tool is susceptible of a wide range of modification, but is preferably provided with a portion designed to be passed through the opening in the cake 1 of a size to snugly fit that opening for two purposes. The fit should be sufficiently snug to enable the cake 1 to be lifted by the engagement of the tool 10 due to frictional contact, and the fit should also be sufficiently snug to prevent access of coating material to the interior of the opening in the cake. The operator merely inserts the tool 10 by a downward stroke along and within the opening in the cake and then lifts the same and preferably turns it to a position where the cake is upright, as seen in Figure 1, so that the frictional engagement will not have to be depended upon as the sole means of support, although ordinarily it is ample for the purpose. When thus engaged, the cake is immersed in the bath 2 and immediately removed therefrom and placed on a suitable support for drying of the coating and for receiving the wrapping, and also for receiving a flexible loop or other support to be passed through the opening of the cake. The chilled condition of the cake 1, when immersed in the bath 2, is sufficient to insure relatively rapid hardening of the coating, so that, when tool 10 is removed from engagement with the cake, little, if any, of the material of the coating will find its way within the opening of the cake, so that a structure substantially as seen in Figure 3 will result in which the cake 1 is covered with a coating 2' of chocolate or the like through the exterior or exposed surfaces while the opening 11 through the cake is left free of coating for enabling observation of the physical condition of the coated cake. The opening 11 also is well adapted to have an antiseptic cord or other flexible engaging means loosely threaded therethrough after the manner set forth in detail in my co-pending application Serial No. 164,311 filed even date herewith and covering the cake structure. Claims for such structure are, therefore, not presented herein, since they are included in said co-pending application.

In Figure 4 is shown a tool 12 having an offset or rightangle portion 13 terminating in a penetrating point 14. The actual shape of the tool seen in Figure 4 is substantially the same as that of the tool seen in Figure 1, except for the penetrating point 14; but the tool of Figure 4 is of reduced diameter and is designed for use in either of two ways. As seen in Figure 4, the point 14 may be thrust into the cake 1 and the cake thus immersed, but such action has two objections. With the use of a penetrating prong parts of the cake 1 may very readily be broken off if the prong is inserted too near an edge of the cake. The other objection is that, when this form of handling of the cake is utilized, the central opening of the cake is coated similarly to the coating of the other surfaces thereof, and the cake is, therefore, no longer subject to observation as to its physical condition. A second manner of use of the tool seen in Figure 4 consists in inserting the rightangle portion 13 through the central opening in the cake and the immersing of the cake with the use of the tool as a support therefor. This method has the advantage of avoiding the danger incident to the use of the penetrating point 14, but is objectionable in resulting in the complete or substantially complete coating of the walls of the central opening of the cake.

It is well known in this art that chocolate and like coatings on ice-cream and like frozen dainties provide such supporting and retaining means, when completely enclosing the cake, as to sustain the same in shape after it has become too soft or otherwise objectionable for eating. In heretofore produced structures and methods of coating cakes of such food products, it has been found necessary to completely seal or wholly enclose the cake, since the coating otherwise would tend to peel or slip from the cake. By forming the cake as herein disclosed, the coating on the exterior surfaces is so shaped as to be incapable of escaping from or peeling off of the cake while free from the objection of completely sealing the cake and while possessing the advantage of affording ready observation of the physical condition of the cake.

What is claimed is:—

The art of producing articles of the class described comprising forming a ring of frozen edible material of sufficient stability to be self-sustaining when encircling a support, inserting a tool in the opening of the ring proportioned to snugly fit said opening, coating the balance of the ring with an edible coating, and removing the tool.

In testimony whereof I affix my signature.

LINZY HICKS.